(12) United States Patent
Brauer et al.

(10) Patent No.: US 11,721,140 B2
(45) Date of Patent: Aug. 8, 2023

(54) SYSTEM AND METHOD FOR PRESENTATION OF REMOTE VEHICLE DIAGNOSTICS AND SERVICE GUIDANCE THROUGH A LOCAL VEHICLE SERVICE SYSTEM

(71) Applicant: Hunter Engineering Company, Bridgeton, MO (US)

(72) Inventors: Blackford F. Brauer, St. Louis, MO (US); James Kaleb Silver, St. Peters, MO (US); Nicholas J. Colarelli, III, Frontenac, MO (US); Timothy A. Strege, Sunset Hills, MO (US)

(73) Assignee: HUNTER ENGINEERING COMPANY, St. Louis, MO (US)

( * ) Notice: Subject to any disclaimer, the term of this patent is extended or adjusted under 35 U.S.C. 154(b) by 486 days.

(21) Appl. No.: 16/908,336

(22) Filed: Jun. 22, 2020

(65) Prior Publication Data
US 2021/0005031 A1    Jan. 7, 2021

Related U.S. Application Data

(60) Provisional application No. 62/905,842, filed on Sep. 25, 2019, provisional application No. 62/869,293, filed on Jul. 1, 2019.

(51) Int. Cl.
*G07C 5/08* (2006.01)
*H04W 4/40* (2018.01)
*G07C 5/00* (2006.01)

(52) U.S. Cl.
CPC .......... *G07C 5/0808* (2013.01); *G07C 5/008* (2013.01); *G07C 5/0841* (2013.01); *H04W 4/40* (2018.02); *G07C 2205/02* (2013.01)

(58) Field of Classification Search
None
See application file for complete search history.

(56) References Cited

U.S. PATENT DOCUMENTS 8,688,313 B2   4/2014  Margol et al.
8,781,442 B1*  7/2014  Link, II .................. H04L 9/30
                                                            370/338

(Continued)

FOREIGN PATENT DOCUMENTS

WO    2018215924 A1   11/2018

OTHER PUBLICATIONS

Astech, "Vehicle Repair Done Right", video file, "https://youtube/BZ0BD0JjR1o", Oct. 15, 2019.

*Primary Examiner* — Abdhesh K Jha
(74) *Attorney, Agent, or Firm* — Sandberg Phoenix & von Gontard PC

(57) ABSTRACT

A system and method for vehicle technician communication utilizing a local vehicle service system operatively coupled to a remote vehicle service system via a network connection. The system enables bi-directional communication between the local service technician and a service specialist associated with the remote vehicle service system by configuring the local vehicle service system with software instructions and hardware to provide a communication interface, such as a software app, graphical user interface, or teleconference functionality. Using the communication interface, the service specialist can: (1) guide the local technician through the initial process of establishing a connection between the vehicle undergoing service or inspection and the remote vehicle service system; (2) direct necessary actions during a diagnostic analysis of the vehicle, such as turning on the vehicle's engine, turning a steering wheel, etc.; and (3) convey results of the vehicle diagnostic analysis in verbal, written, or visual form.

7 Claims, 10 Drawing Sheets

(56) References Cited

U.S. PATENT DOCUMENTS

| | | |
|---|---|---|
| 9,087,420 B2 | 7/2015 | Amirpour et al. |
| 9,520,006 B1 * | 12/2016 | Sankovsky ........ G06Q 30/0207 |
| 9,684,500 B2 | 6/2017 | Margol et al. |
| 10,580,226 B2 | 3/2020 | Merg et al. |
| 10,706,645 B1 * | 7/2020 | Herron ................. G07C 5/0825 |
| 11,414,092 B2 | 8/2022 | Patnala et al. |
| 2014/0249696 A1 | 9/2014 | Margol et al. |
| 2018/0286146 A1 | 10/2018 | Liu et al. |
| 2020/0202645 A1 * | 6/2020 | Gintz ................... G07C 5/0825 |

\* cited by examiner

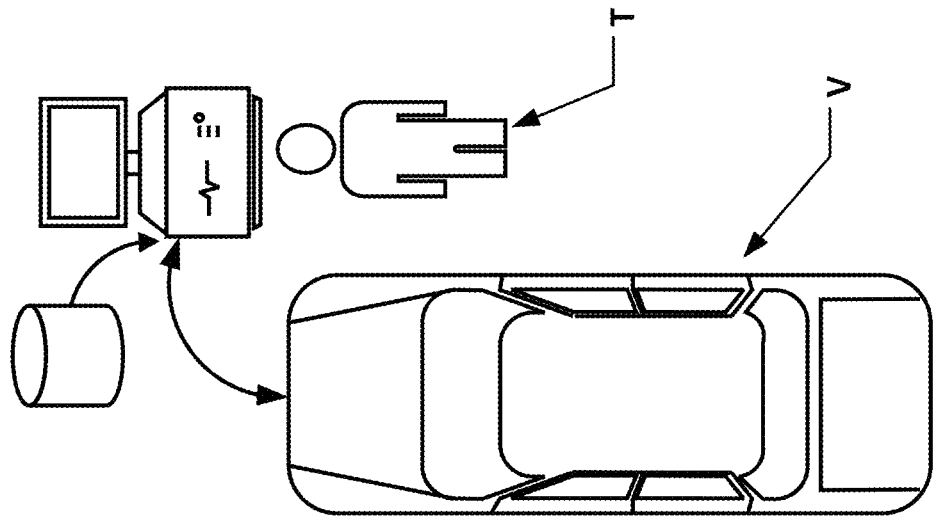
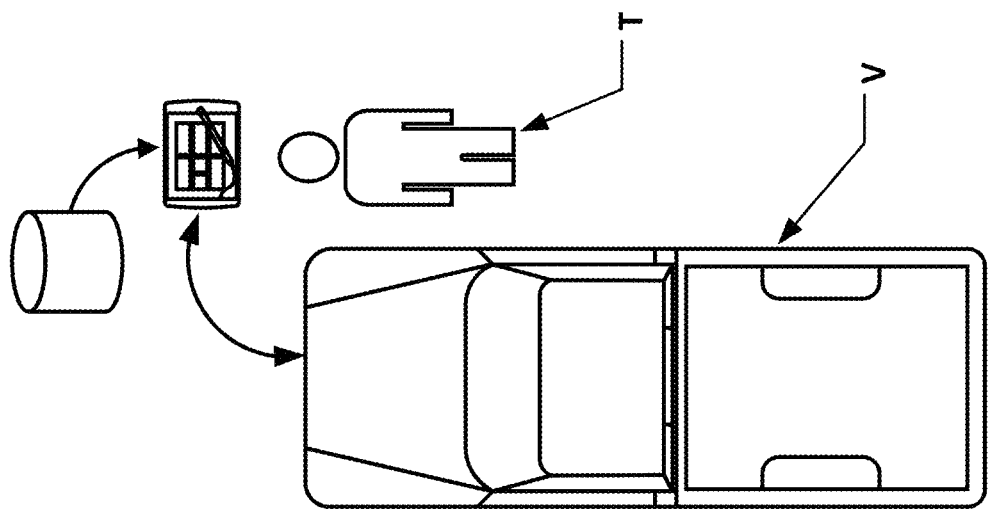
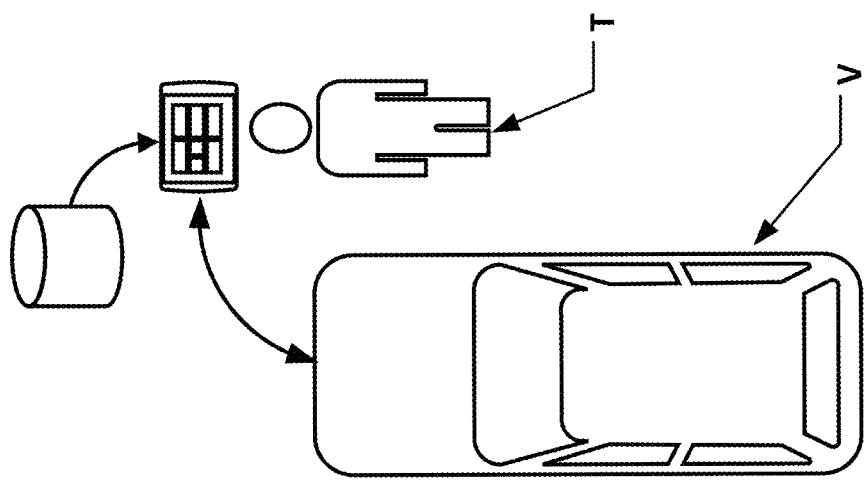
FIGURE 1
PRIOR ART

Prepare Vehicle For Calibration

Vehicle Calibration Details for Remote Service Technician.

VIN: 1NAL11D96C260042

Shop Name: Bob's Collision Repair

Remote Tool ID: XYZ-12789

Tech ID: Bob

Phone: 314-555-1234

1. Reason For Calibration
- [X] Collision – Affected Areas
  - [X] Front
  - [ ] Rear
  - [ ] Left or Right Side
- [ ] Windshield Replacement
- [ ] Component Replacement
  - *Ex: Side View Mirror*
- [X] Wheel Alignment
- [ ] Other
  - *Details*

2. Systems to Calibrate
- [ ] Forward Facing Camera
- [X] Forward Facing Radar
- [ ] LIDAR
- [ ] Surround Cameras
- [X] Blind Spot / Corner Radar
- [ ] Other

3. Choose Cal. Fixture and Targets
- [ ] Type 1
- [X] Type 2
- [ ] Type 3
- [ ] Type 4
- [ ] Type 5
- [ ] Other

[Submit To Remote Service]

Check all applicable fields, then "Submit to Remote Service Technician".

| Cancel | Back | Position ADAS Fixture | Calibration Complete |

← GUI

FIGURE 6

Vehicle ADAS Sensor Calibration Report Details.

Prepare Vehicle For ADAS Sensor Calibration

VIN: 1NAL11D96C260042

Shop Name: Bob's Collision Repair

Service SystemID: XYZ-12789

Tech ID: Bob

1. Reason For Calibration
- [X] Collision – Affected Areas
  - [X] Front
  - [ ] Rear
  - [ ] Left or Right Side
- [ ] Windshield Replacement
- [ ] Component Replacement
  - *Ex: Side View Mirror*
- [X] Wheel Alignment
- [ ] Other
  - *Details*

2. Systems to Calibrate
- [ ] Forward Facing Camera
- [X] Forward Facing Radar
- [ ] LIDAR
- [ ] Surround Cameras
- [X] Blind Spot / Corner Radar
- [ ] Other

3. Choose Cal. Fixture and Targets
- [ ] Type 1
- [X] Type 2
- [ ] Type 3
- [ ] Type 4
- [ ] Type 5
- [ ] Other

[Submit For Upload to Diagnostic Scan Tool]

Check all applicable fields, then "Submit To Diagnostic Scan Tool".

[Cancel] [Back] [Position ADAS Fixture] [Calibration Complete]

← GUI

FIGURE 10

SYSTEM AND METHOD FOR PRESENTATION OF REMOTE VEHICLE DIAGNOSTICS AND SERVICE GUIDANCE THROUGH A LOCAL VEHICLE SERVICE SYSTEM

CROSS-REFERENCE TO RELATED APPLICATIONS

The present application is related to, and claims priority from, U.S. Provisional Patent Application Ser. No. 62/869,293 filed on Jul. 1, 2019, and is further related to, and claims priority from, U.S. Provisional Patent Application Ser. No. 62/905,842 filed on Sep. 25, 2019, both of which are herein incorporated by reference.

STATEMENT REGARDING FEDERALLY SPONSORED RESEARCH

Not Applicable.

BACKGROUND OF THE INVENTION

The present application is related to vehicle-specific diagnostic and service procedures implemented by remote vehicle-specific service devices operatively coupled to the electronic control modules of a vehicle during a vehicle service process, and in particular, to a method and system wherein a service technician in proximity to the vehicle utilizes a local vehicle service system to communicate with, receive instruction from, and view information presented by, a diagnostic tool or a service specialist or located at a remote location.

As vehicles have become increasingly computerized, many diagnostic and repair procedures require a service technician to interface with the onboard computer systems or electronic control units (ECUs) of the vehicle via a standardized data connection commonly referred to as an OBD-II connection. For example, proper operation of many Advanced Driver Assistance System (ADAS) components on modern vehicles, such as adaptive cruise control, lane departure warning systems, collision avoidance systems, and blind spot monitoring systems must be evaluated prior to performing mechanical adjustments on a vehicle, as well as after repair or replacement of damaged or worn vehicle components. Using a generic diagnostic device or scan tool, a technician connects to the OBD-II connection on the vehicle, and reads out status codes from the onboard computer systems or ECUs during a vehicle service. In some cases, commands used to conduct a calibration or other service procedure are relayed to the vehicle using the same device and connection. As vehicle complexity has increased, vehicle manufacturers have incorporated increased functionality in the onboard computer systems and ECUs. Access to the advanced functionality often requires vehicle-specific or manufacturer-specific diagnostic devices or scan tools. (FIG. 1). These vehicle- and manufacturer-specific diagnostic devices or scan tools are costly, and are required in order to perform some service procedures on newer vehicles, representing a significant expenditure for independent automotive repair shops seeking to service a wide range of modern vehicle makes and models. In some cases, access to these specialized diagnostic devices or scan tools is restricted to manufacturer-approved dealerships or repair shops, leaving independent shops and do-it-yourself mechanics with few options to properly service a full range of desired vehicles.

Recent industry changes require that vehicle manufacturers make vehicle-required diagnostic and scan software applications available to technicians upon request, from an accessible software archive, enabling independent shops and do-it-yourself mechanics to service vehicles, as well as dealers seeking to service off-brand vehicles. These software applications, once downloaded via a network, are installed on a local personal computer (PC) and communicate with the electronic control modules of a vehicle undergoing service via the standardized interface. Typically, the local PC includes: (1) at least one display, or other physical means of displaying electronic graphic content; (2) one or more Human Interface Devices (HIDs), the most common of which are keyboards and mice, to provide a means to interact with the environment; (3) a network interface card (NIC) to connect to various network(s) providing data and applications; and (4) a transport bus, such as a universal serial bus (USB) to connect devices such as printers, diagnostic tools, or OBD port readers to the computing environment. Usage of the diagnostic and scan software applications, once downloaded, may be restricted to use during single vehicle service via an authentication or subscription service provided by the vehicle manufacturer. Different vehicle makes and or models require different software applications, thereby requiring a service technician to locate and install appropriate applications prior to performing a vehicle service or inspection.

While downloadable software applications enable more complete diagnostic and service of modern vehicles by a wide range of service providers, it has been found that installation of multiple downloadable software applications for different vehicle makes and models on a single local PC often produces conflicts and problems. Hence, it often becomes necessary to remove the software applications following completion of a vehicle service in order to properly install different software applications required to service subsequent vehicles. Alternatively, a service shop may maintain a separate dedicated local PC for each vehicle-specific software application. Failure to do so may lead to PC system crashes, failures, or improper vehicle diagnostics. Vehicle service technicians are generally not well skilled at performing software downloads, installations, and debugging procedures prior to or following each vehicle service.

As an alternative to having a service technician perform the vehicle diagnostic procedure locally at the vehicle service shop using vehicle-specific diagnostic equipment, remote vehicle diagnostics and analysis is increasing in popularity. In a remote vehicle diagnostic process, a vehicle arriving at a vehicle service shop is coupled to a vehicle-specific diagnostic interface device by the local service technician. The diagnostic interface device is in turn, operatively coupled to an accessible network, such as the Internet, to establish a connection to a vehicle diagnostic service located at a remote location and operated by a service specialist. The vehicle diagnostic service provides the necessary vehicle-specific diagnostic tools and equipment at the remote locations, and performs the vehicle diagnostic procedures by communicating with the vehicle control modules and electronic systems via the network connection. Instructions, guidance, and results are conveyed from the service specialist to the locate service technician via telephone, fax, or e-mail.

One limitation of using a remote vehicle diagnostic service and remote service specialist is a lack of a convenient means for displaying vehicle diagnostic results to the local service technician, and the need for reliance on voice communication between the local service technician and the remote service specialist when setting up vehicle diagnostic equipment, identifying unique features of the vehicle undergoing service, or discussing the results of a diagnostic procedure on the vehicle.

Accordingly, it would be advantageous to provide a local vehicle service technician with a means for enhanced communication with vehicle diagnostic scan tools and devices, and with remote vehicle diagnostic services and remote service specialist in preparation for, and during the diagnostic analysis, calibration, or service of a vehicle. It would be further advantageous to provide such means for enhanced communications through the use of existing vehicle service systems already present in the vehicle service shop.

BRIEF SUMMARY OF THE INVENTION

Briefly stated, the present application sets forth an enhanced system for communication between a local service technician and a vehicle service system configured to interact with the on-board electronic systems of a vehicle undergoing a service procedure.

In one embodiment, a local vehicle service system, such as a vehicle wheel alignment measurement system, is operatively coupled to a remote vehicle service system via a network connection to enable bi-directional communication between a local service technician and a service specialist associated with the remote vehicle service system. The local vehicle service system is configured with software instructions and hardware to provide a suitable communication interface, such as a software application, graphical user interface (GUI), or video-conference functionality. Using the communication interface, the service specialist can: (1) guide the local technician through the initial process of establishing a connection between the vehicle undergoing service or inspection and the remote vehicle service system; (2) direct necessary actions by the local technician during a diagnostic analysis of the vehicle, such as starting/stopping the vehicle's engine, turning a steering wheel, etc.; and (3) convey results of the vehicle diagnostic analysis in verbal, written, or visual form.

In a further embodiment, a local vehicle service system, such as a vehicle wheel alignment measurement system is operatively coupled to a vehicle diagnostic device or scan tool connected to the vehicle electronic systems, via a network connection to enable bi-directional communication. During a vehicle service procedure, the vehicle wheel alignment measurement system communicates with the vehicle diagnostic device or scan tool to identify the vehicle undergoing service, and to identify vehicle-specific service actions required, such as the performance of a vehicle status scan prior to beginning a vehicle service procedure, or following the completion of a vehicle service procedure for verification. Following communication of the vehicle identity and vehicle-specific required service actions from the wheel alignment measurement system to the vehicle diagnostic device or scan tool, the local service technician carries out vehicle-specific instructions presented by a graphical user interface or visual display on the vehicle diagnostic device or scan tool. Upon completion of the required service actions, the vehicle diagnostic device or scan tool conveys data containing service results and/or vehicle status back to the vehicle wheel alignment measurement system, or to a cloud-based data store, for incorporation into a service record or repot associated with the vehicle.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 1 is a prior art illustration of multiple vehicles undergoing service and/or inspection, each utilizing a dedicated diagnostic scan tool configured with a vehicle-specific software application;

FIG. 6 is an illustration of an exemplary vehicle service GUI, enabling a technician to provide relevant information for communication to the remote vehicle diagnostic system;

FIG. 10 is an illustration of an exemplary vehicle service GUI, similar to FIG. 6, enabling a technician to provide relevant information for communication to a local vehicle diagnostic scan tool via the cloud-based vehicle service system and for incorporation into a comprehensive vehicle service report generated by the cloud-based vehicle service system.

Corresponding reference numerals indicate corresponding parts throughout the several figures of the drawings. It is to be understood that the drawings are for illustrating the concepts set forth in the present disclosure and are not to scale.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Figure 2:
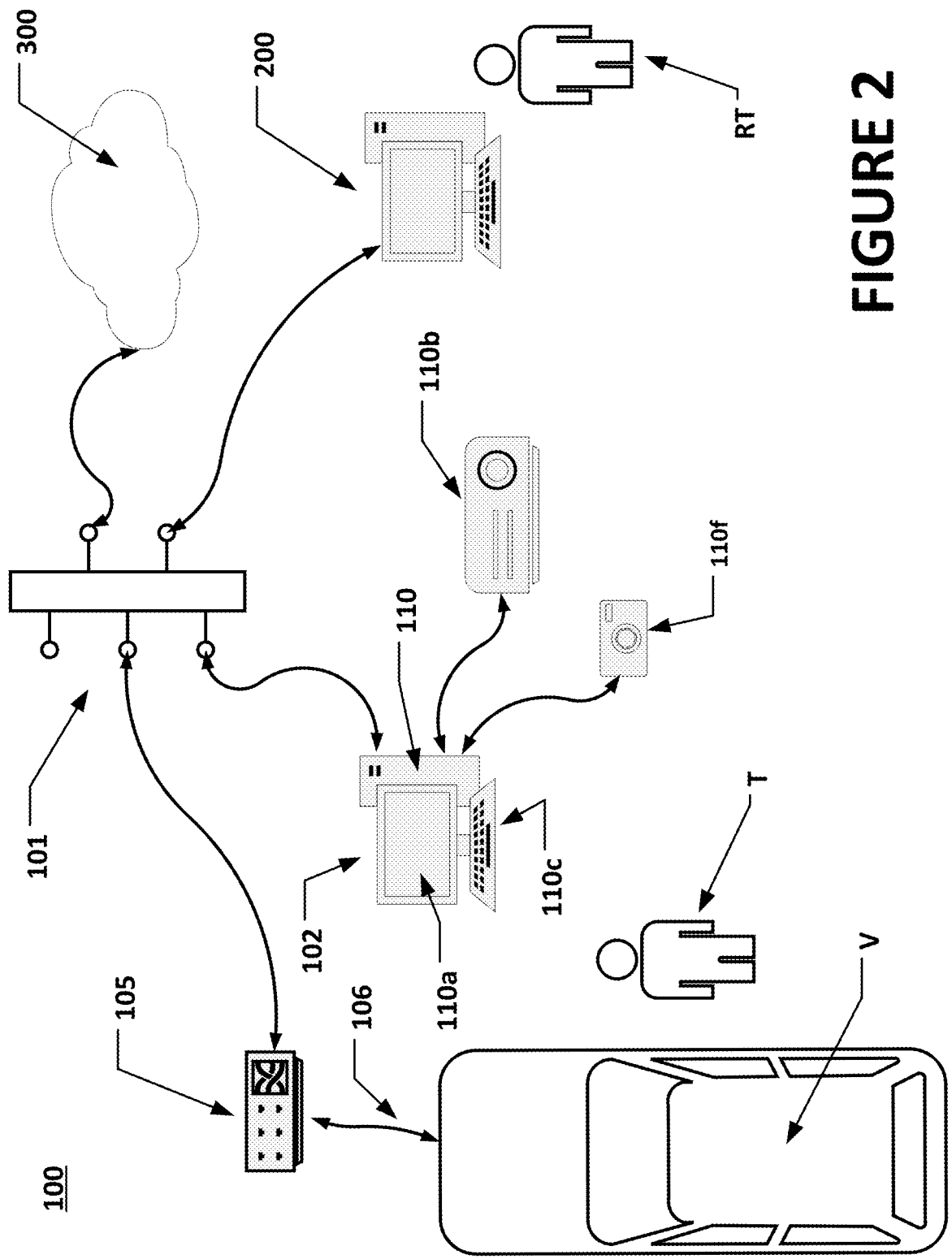
FIG. 2 is an illustration of an embodiment of the present disclosure, wherein a single vehicle undergoes service and/or inspection, utilizing a remote vehicle diagnostic service and associated database, with bi-directional communication established between a local technician and a remote service assistant through a local vehicle service system.

Turning to the figures, and to FIG. 2 in particular, components of one embodiment of a vehicle diagnostic or analysis system for interaction with the on-board electronic systems of a wide range of vehicle V makes and models are shown generally at 100. The vehicle diagnostic system 100 utilizes a local interface device 105 to establish bi-directional communication over a network 101 between the vehicle V and a remote vehicle diagnostic system 200 in order to conduct an evaluation of some vehicle components and functionality. The local interface device 105 operatively couples to a diagnostic connection onboard the vehicle V and provides a pathway for bi-directional communication between external devices and the various electronic control modules and sensors onboard the vehicle V. An exemplary standardized communication interface 106 is an SAE J2534 compliant interface enabling bi-directional communication between the vehicle systems and an application program interface (API) from the vehicle manufacturer. Other non-SAE J2534 compliant solutions for enabling bi-directional communication may be utilized without departing from the scope of the invention.

Local vehicle service systems 102 present in the vehicle service shop, such as a vehicle wheel alignment measurement system intended for use with a wide range of vehicles V, may include a local personal computer (PC) or other processing system 110 having conventional user interface components. These user interface components may include one or more display monitors 110a and/or projectors 110b for displaying electronic graphic content, human interface devices 110c such as speakers, cameras, a keyboard, and mouse, a network interface card (NIC) for connection to various networks, and a standardized communication interface. The local PC or processing system 110 is configured with an operating system and software instructions to provide a suitable graphical user interface GUI on the display monitor 110a for a service technician T, and to conduct intended vehicle service procedures. Additional tools and fixtures which may be required to complete relevant vehicle service procedures are provided, such as wheel alignment sensors or optical camera systems 110d, ADAS calibration tools, optical projectors 110e, and associated fixtures.

Figure 3:
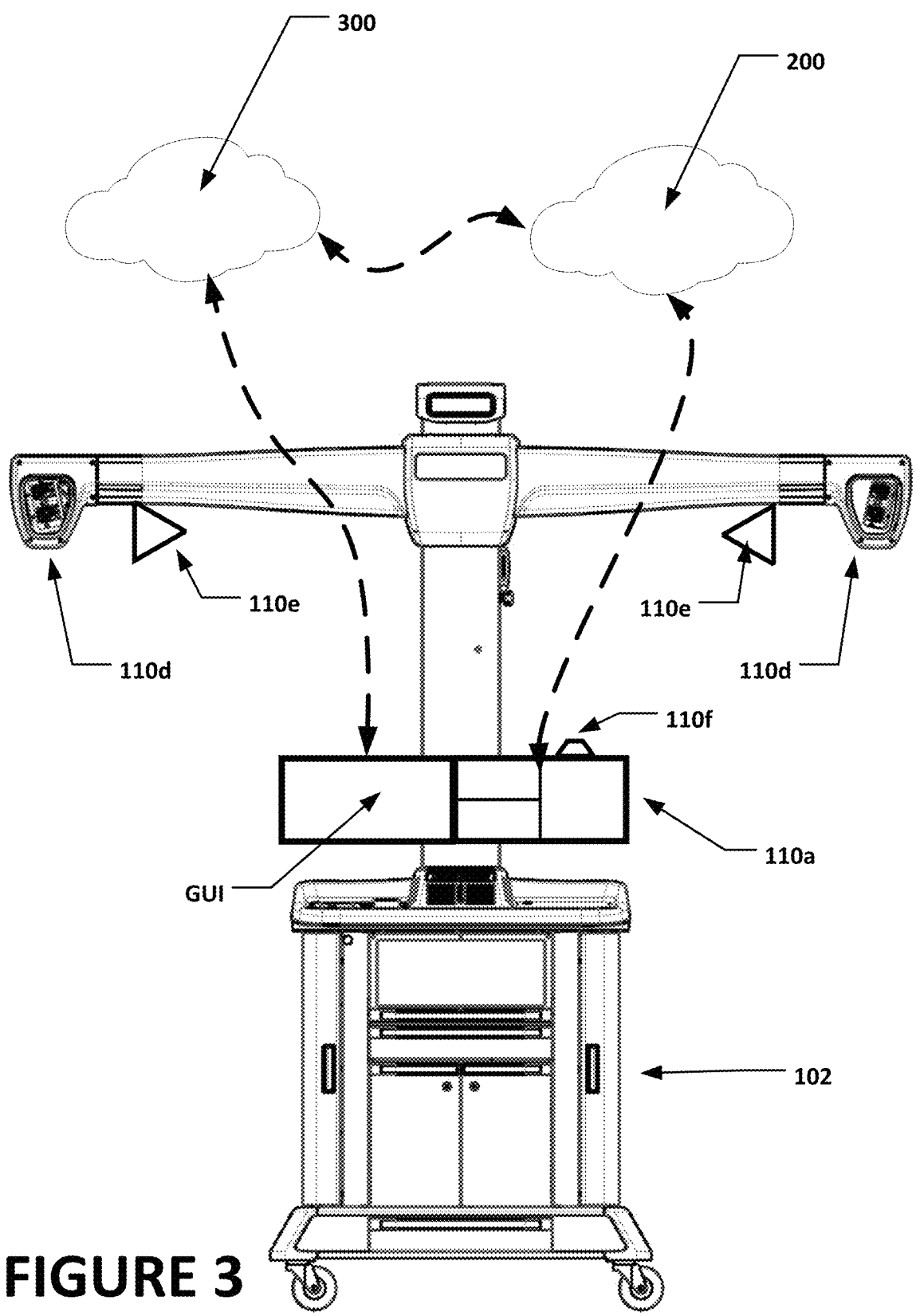
FIG. 3 is an illustration of a vehicle service system configured for use with the remote diagnostic methods of the present disclosure, incorporating dual monitors for GUI display, a set of ADAS calibration tools and fixtures, as well as communication links to a cloud-based vehicle service software and data storage systems and to a remote vehicle diagnostic system.

As shown in FIG. 3, the processing system 110 of the local vehicle service system 102 is optionally further connected, via a suitable communications pathway such as a network interface card and the internet, to a cloud-based vehicle service system 300 wherein software application associated with vehicle service procedures reside. The processing system 110 is configured to access the cloud-based vehicle service system 300 to recall the latest specifications associated with a vehicle V undergoing service, to access the most current version of vehicle-specific service software available, as well as to upload and store vehicle data and service results.

The communications pathways provide for additional connections between the local processing system 110, the cloud-based vehicle service system 300, and a remote vehicle diagnostic system 200. The remote vehicle diagnostic system 200 may be configured to exchange information and data directly with the cloud-based vehicle service system 300, such as to receive vehicle-specific data or to return vehicle service results, and with the processing system 110 of the local vehicle service system 102 for facilitating a specific or specialized vehicle-specific service procedure not otherwise available to the local vehicle service system.

In one embodiment, the remote vehicle diagnostic system 200 is responsive to a request input at the local vehicle service system 102 by the local service technician T, such as through the graphical user interface GUI. The software instructions installed at the local processing system 102 enable the local service technician T to communicate with the remote vehicle diagnostic system 200, and an associated remote service assistant or specialist RT during use of the remote vehicle diagnostic system 200. Such communication may be by video conference, audio link, or other messaging system. For example, a dedicated software application for providing connectivity via a web-cam 110f or other video conference device may be installed at the local vehicle service system 102 and utilized to establish appropriate communications between the local service technician T and the remote service specialist RT as needed.

During communication, the remote service specialist RT can: (1) guide the local service technician T through the initial process of establishing a connection between the vehicle V undergoing service or inspection and the remote vehicle service system 200; (2) direct necessary local actions during a diagnostic analysis of the vehicle V, such as starting/stopping the vehicle's engine, turning a steering wheel, etc., placing any required ADAS sensor targets relative to the vehicle; and (3) convey results of the vehicle diagnostic analysis in verbal, written, or visual form through the GUI.

In one embodiment of the present disclosure, once a bi-directional communication link between the local service technician T and the remote service specialist RT is established via the local service system 102, the remote service specialist RT can receive still-frame or video-images of the vehicle V undergoing service, and the shop environment, via the user interface and audio-visual accessories of the local service system 102. Having a visual understanding of the service shop environment enables the remote service specialist RT to provide clear instructions to the local service technician T to guide the placement of vehicle service fixtures in proximity to the vehicle V, as well as to establishing proper connections between the remote vehicle service system 200 and the vehicle onboard electronics. Results of a vehicle diagnostic analysis conducted by the remote vehicle service system 200 can be presented to the local service technician T via the local service system GUI, routed to a local printer, or presented on a local display such as a screen or projection system. Additionally, the results of the vehicle diagnostic analysis may be conveyed from the remote vehicle service system 200 directly to the cloud-based vehicle service software and data storage systems 300 for incorporation into stored vehicle service records and/or generated diagnostic reports.

Within the local vehicle service system 102, the software instructions which enable the bi-direction communication functionality with the remote vehicle diagnostic system 200 and service specialist RT may be in the form of a stand-alone software application, an applet which resides within an app interface of another software program, or integrated within an existing vehicle diagnostic software program, such as a vehicle wheel alignment diagnostic program. Exemplary software programs/video conferencing services such as Zoom, Microsoft Teams, and GoToMeeting provide bidirectional video chat features, facilitate sharing of GUI screens and facilitate data messaging between the local vehicle service system 102 and the remote vehicle service system 200.

In a further embodiment, the vehicle diagnostic system 100 is configured to establish bi-directional communication over a network 101 between the local vehicle service system 102 and the local interface device 105 in the form of a vehicle diagnostic or scan tool, which is operatively coupled to the vehicle V, in order to conduct an evaluation of some vehicle components and functionality. When configured as a vehicle diagnostic or scan tool, the local interface device includes a processor, an onboard display for presenting a graphical user interface under control of the processor, and a data storage containing operating instructions for interfacing with a range of vehicle makes and models. The local interface device 105 is connected to a diagnostic port onboard the vehicle V, such as by using an SAE J2534 compliant solution which provides a pathway for bi-directional communication between external devices and the various electronic control modules and sensors onboard the vehicle V. Other non-SAE J2534 compliant solutions for enabling bi-directional communication may be utilized without departing from the scope of the invention.

The local interface device 105 is responsive to commands or instructions input at the local vehicle service system 102 by the local service technician T, such as through the service system graphical user interface GUI. Exemplary commands or instructions include requests to generate a record of, or to verify the status of, one or more vehicle onboard systems, such as the functionality of a vehicle ADAS device prior to, or following, a vehicle service procedure, or recalibrating vehicle ADAS devices following other vehicle services, such as wheel alignment adjustments. The software instructions installed at the local vehicle service system 102 enables the local service technician T to communicate directly with the local interface device to identify the vehicle, and to initiate selected vehicle service procedures. Once a vehicle is identified to the local interface device 105, and a service procedure is initiated by the local service technician T from the local vehicle service system 102, the local service technician's focus is shifted to the GUI of the local interface device 105 for further operating instructions. During operation, the local interface device 105 can: (1) guide the local service technician T through the initial process of establishing a connection between the vehicle V undergoing service or inspection and the local interface device 105; (2) direct the local service technician T to carry out necessary local actions during a diagnostic analysis of the vehicle V, such as placing ADAS targets relative to the vehicle, starting/stopping the vehicle's engine, turning a steering wheel, etc.; and (3) convey results of the vehicle diagnostic analysis. The vehicle diagnostic results may be conveyed directly to the local service technician T directly through the GUI of the local interface device, communicated to the local vehicle service system 102 for display and incorporation into a vehicle service record, and/or communicated to a cloud-based vehicle service software and data storage system 300 for incorporation into stored vehicle service records and/or generated diagnostic reports.

The present disclosure can be embodied in-part in the form of computer-implemented processes and apparatuses for practicing those processes. The present disclosure can also be embodied in-part in the form of computer program code containing instructions embodied in tangible media, or another computer readable non-transitory storage medium, wherein, when the computer program code is loaded into, and executed by, an electronic device such as a computer, micro-processor or logic circuit, the device becomes an apparatus for practicing the present disclosure.

A method of the present disclosure for conducting a vehicle wheel alignment service and/or inspection utilizing a local vehicle alignment measurement system 102 in conjunction with a remote vehicle service system 200 to complete any required vehicle onboard ADAS sensor adjustments begins by identifying the vehicle V to the local vehicle alignment measurement system 102. Vehicle identification can be completed automatically by the local vehicle alignment measurement system, such as by license plate recognition, lookup, and VIN conversion, or may be completed by the local service technician T through a suitable graphical user interface GUI. Once the vehicle V is identified to the local vehicle alignment measurement system, 102 the local technician T further identifies the specific procedures to be carried out, i.e., a wheel alignment followed by an ADAS sensor calibration utilizing a remote vehicle service system 200. The local service procedures, such as conducting a wheel alignment inspection and making any necessary adjustments to the vehicle are then carried out by the local technician T in a conventional manner.

Figure 4:
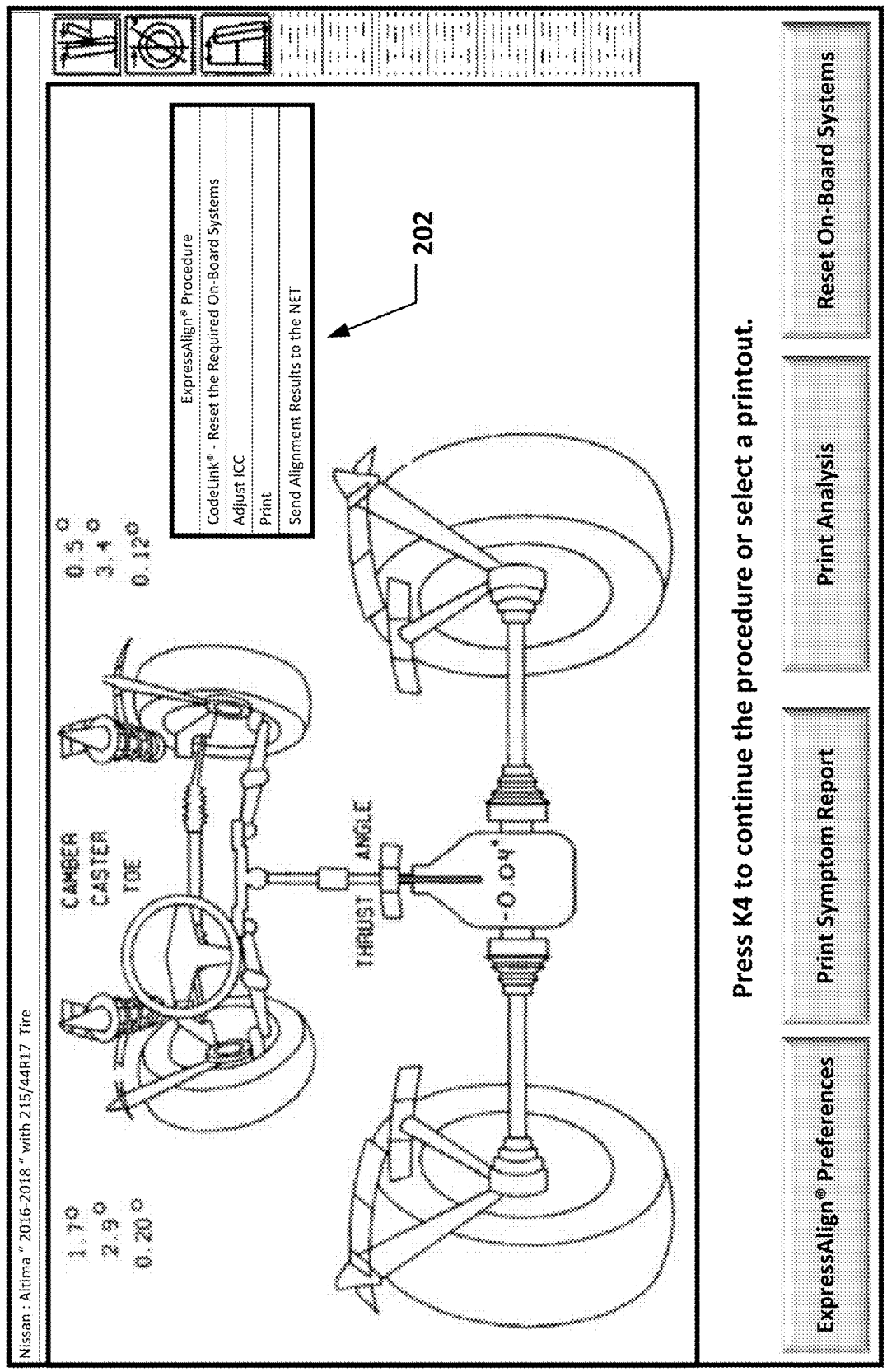
FIG. 4 is an illustration of a vehicle service GUI, representing completed vehicle wheel alignment results, and providing a technician with an option to proceed to reset, calibration, or adjust vehicle on-board ADAS sensors and systems.
Figure 5:
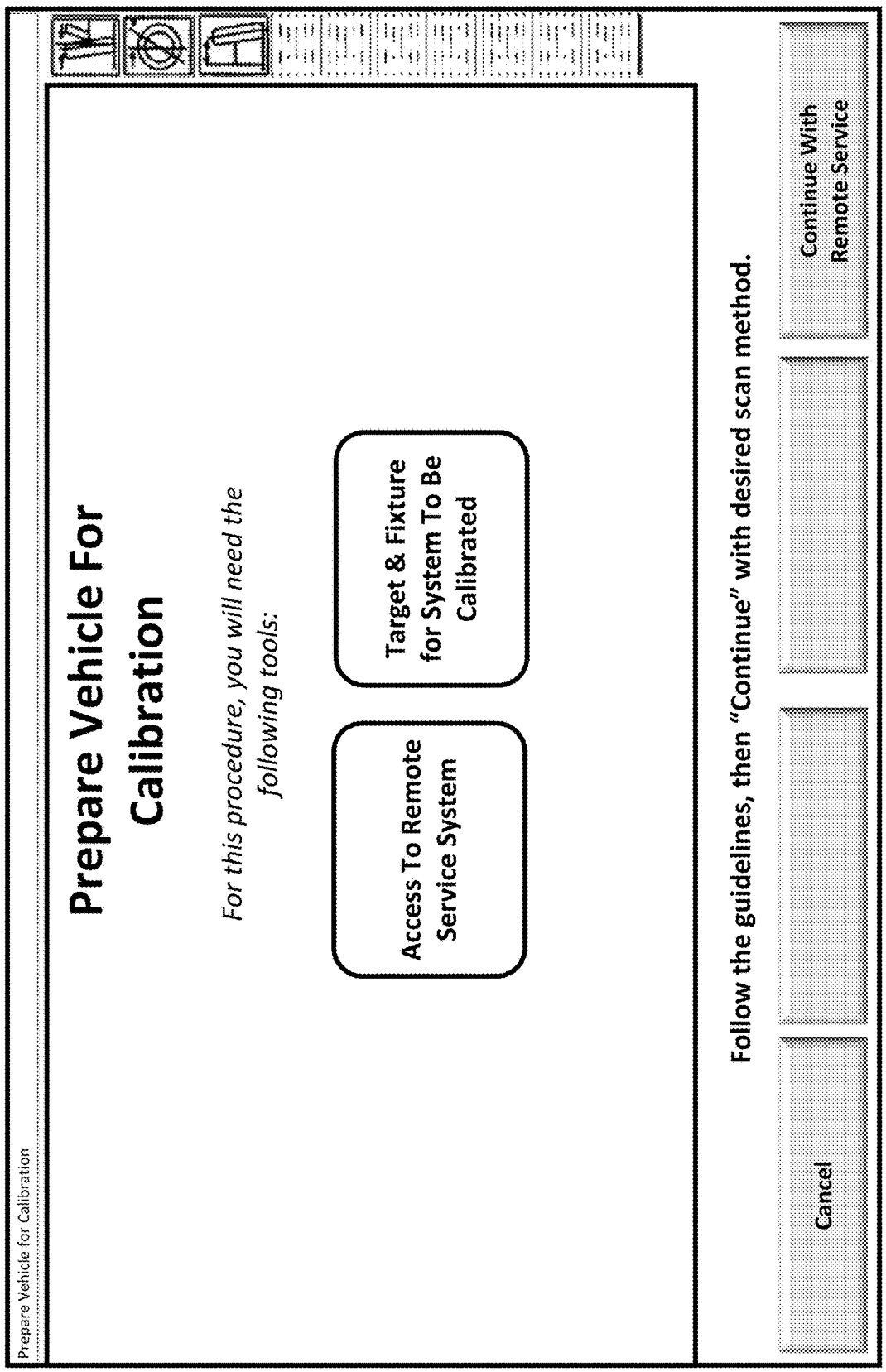
FIG. 5 is an illustration of a vehicle service GUI, providing a technician with instructions associated with the use of a remote vehicle diagnostic system.

Once the local service procedure is completed, the graphical user interface GUI presents the local technician T with a display of the results, and provides a button, link, or access point (shown at 202 in FIG. 4) to begin the process of connecting with the remote vehicle service system 200 to carry out an inspection and/or recalibration of the vehicle onboard ADAS sensor systems (FIG. 5). Prior to establishing the connection, the graphical user interface GUI presents the local service technician T with a set of questions or forms to complete in order to provide the remote vehicle service system 200 and the remote service specialist RT with information regarding the specific vehicle and/or the specific vehicle services which the local service technician T is seeking to complete. (FIG. 6). Once any required information is entered, the data is communicated via the network connection to the remote vehicle service system 200, and a bi-directional communication link is established.

Activation of the bi-directional communication link allows the local processing system to present the local service technician T with additional features of the graphical user interface GUI. For example, the use of a video conferencing GUI window enables the local service technician to communicate directly with a remote service specialist RT at the remote vehicle service system 200, while simultaneously viewing current vehicle measurements generated by the local wheel alignment system 102. Operator instructions, generated by the remote service system 200 in response to data received either passed through the local vehicle service system 102 from vehicle diagnostic tools 105 coupled to the vehicle by the local technician T, or generated by the local vehicle service system may be displayed concurrent with the video conferencing GUI window and current vehicle measurements. The remote vehicle service system 200 (and the remote service specialist RT) can provide the local service technician T with instructions guiding the selection and placement of ADAS calibration fixtures, the use of necessary tools, or the acquisition of specific measurements necessary for the remote vehicle service system 200 to carry out a specific vehicle service procedures. Once completed the results of each procedure carried out by the remote vehicle service system 200 are conveyed to the local service technician T via the communication link and GUI, and/or are communicated to the cloud-based vehicle service system 300 for inclusion in a vehicle service record and/or service report.

Figure 7:
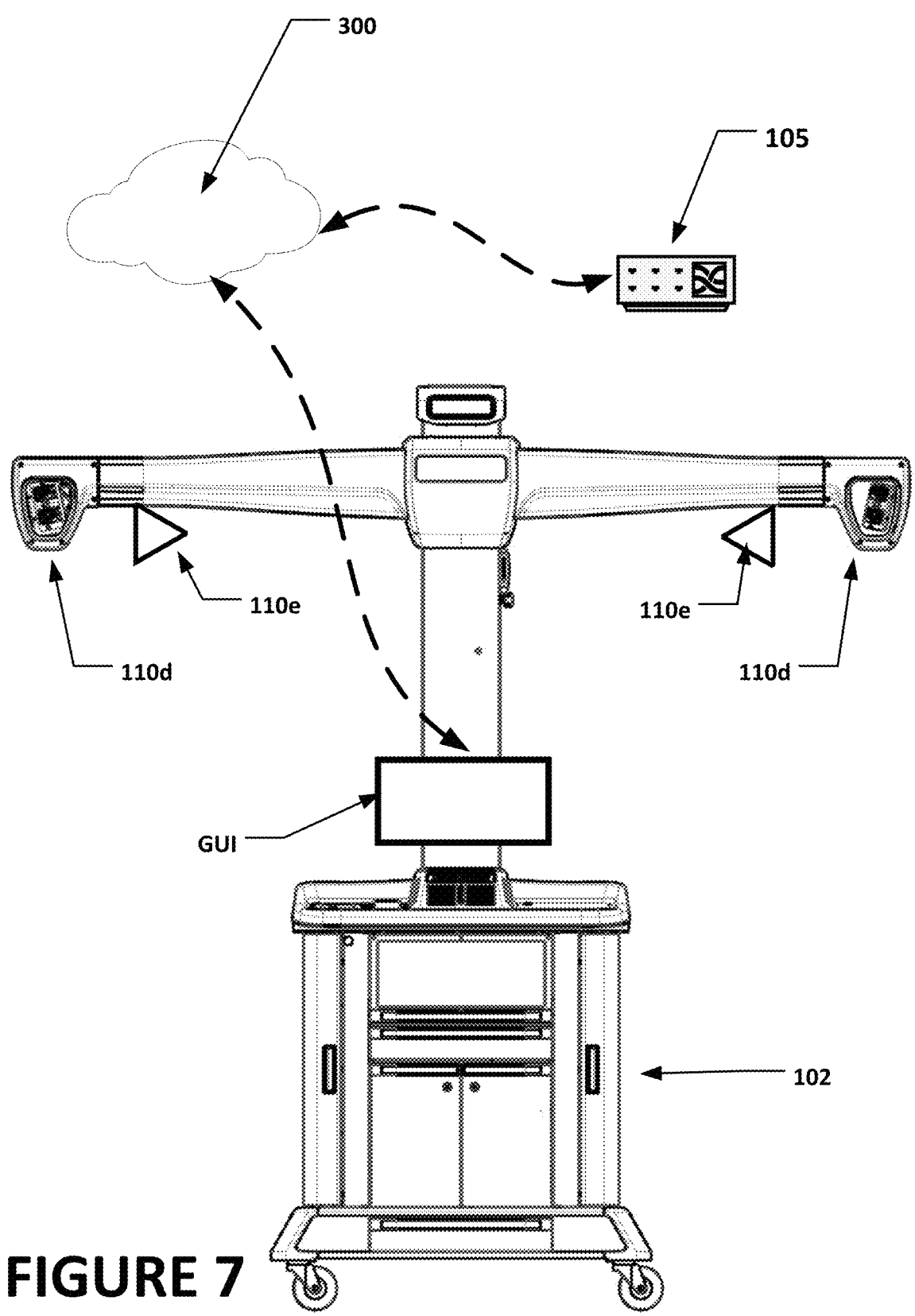
FIG. 7 is an illustration of an alternate configuration of a vehicle service system employing communication links to a cloud-based vehicle service system to communicate between a local vehicle service system and a local vehicle scan tool.
Figure 8:
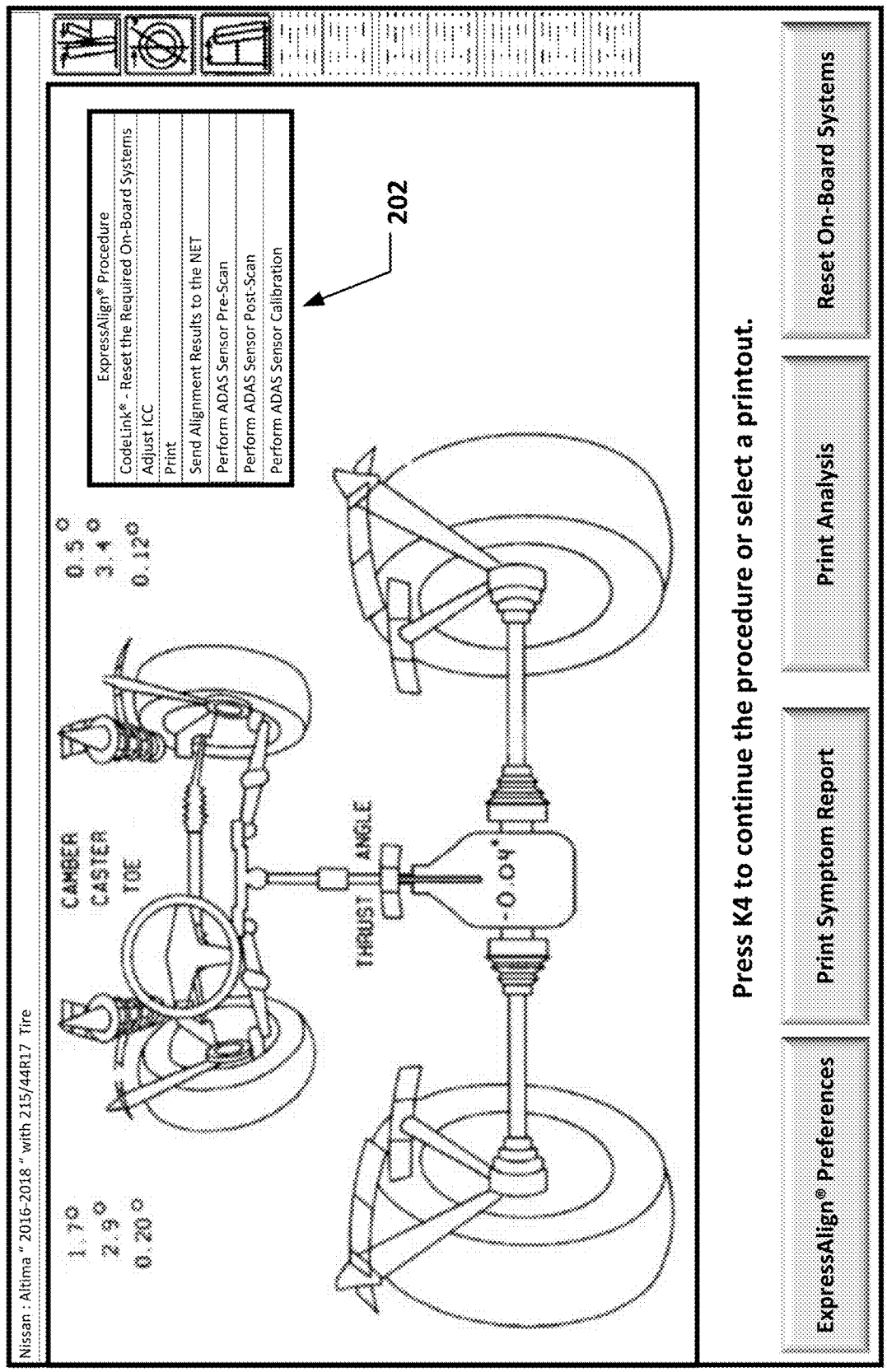
FIG. 8 is an illustration of a vehicle service GUI, similar to FIG. 4, providing a technician with an option to proceed to utilize a local vehicle scan tool to conduct various vehicle onboard ADAS procedures.

Turning to FIG. 7, a further method of the present disclosure for conducting a vehicle wheel alignment service and/or inspection utilizes a local vehicle service system 102, such as an alignment measurement system, a local interface device 105 configured as a vehicle diagnostic scan tool, and an interconnected cloud-based vehicle service system 300 to complete vehicle service procedures requiring connection on the vehicle's onboard systems, such as a vehicle onboard ADAS sensor adjustment. The method begins by identifying the vehicle V to the local vehicle service system 102. Vehicle identification can be completed automatically by the local vehicle alignment measurement system, such as by license plate recognition, lookup, and VIN conversion, or may be completed by the local service technician T through a suitable graphical user interface GUI. Once the vehicle V is identified to the local vehicle service system, 102 the local technician T utilizes the GUI as seen at FIG. 8 to identify or select the specific procedures to be carried out, for example, a sequence involving a vehicle ADAS sensor pre-service diagnostic scan, a wheel alignment adjustment, an vehicle ADAS sensor calibration, and a vehicle ADAS sensor post-service diagnostic scan. The traditional service procedures, such as a wheel alignment inspection and/or adjustments to the vehicle V, which do not require access to the onboard vehicle electronic systems, are carried out by the local technician T in a conventional manner using the local vehicle service system 102, and generate a first set of vehicle service results for display, communication to the cloud-based vehicle service system 300, and/or inclusion in a vehicle service report.

Figure 9:
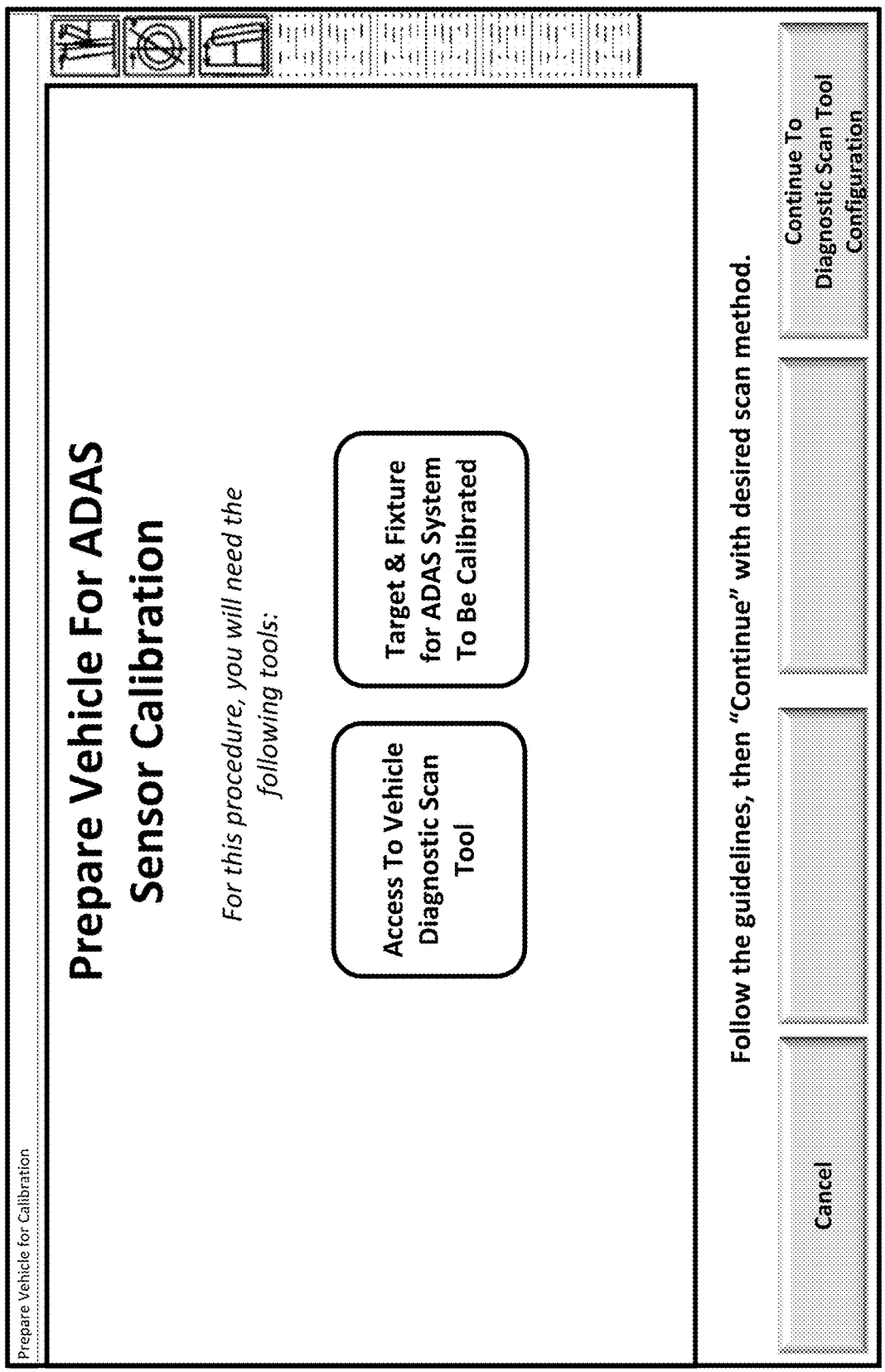
FIG. 9 is an illustration of a vehicle service GUI, similar to FIG. 5, providing a technician with instructions associated with the use of a local vehicle diagnostic scan tool.

When the identified procedures require access to the onboard vehicle electronic systems, such to conduct pre- or post-service vehicle ADAS sensor diagnostic scans or ADAS sensor calibrations, the graphical user interface GUI of the local service system 102 presents the local technician T with a means to continue the service procedures using the local interface device 105 to carry out the scans and/or recalibration procedures, as seen at FIG. 9. Data identifying the vehicle configuration and the requested procedures, such as shown at FIG. 10 is conveyed from the local vehicle service system 102 to the local interface device 105 via the cloud-based vehicle service system 300, and may be incorporated into any generated vehicle service reports. The local service technician T is guided, via a user interface on the local interface device 105, to carry out any required steps for connecting the local interface device 105 to the vehicle or carrying out the selected vehicle service procedure. For example, the local interface device 105 provides the local service technician T with instructions guiding the selection and placement of ADAS calibration fixtures, the use of necessary tools, or the acquisition of specific measurements necessary for the remote vehicle service system 200 to carry out a specific vehicle service procedures. Once completed, a second set of vehicle service results associated with each procedure carried out by the local interface device 105 are presented to the local service technician T via a GUI, and/or are communicated via a communication link to either the local vehicle service system 102 or a cloud-based vehicle service system 300 for inclusion in a vehicle service record and/or service report together with the vehicle service results from the traditional vehicle services performed (if any) on the vehicle.

The present disclosure can also be embodied in-part in the form of computer program code, for example, whether stored in a non-transitory storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits. As various changes could be made in the above constructions without departing from the scope of the disclosure, it is intended that all matter contained in the above description or shown in the accompanying drawings shall be interpreted as illustrative and not in a limiting sense.

The invention claimed is:

1. A method for conducting a vehicle service on a vehicle disposed in a vehicle service area, comprising:
   performing a vehicle inspection and/or adjustment to said vehicle with a local vehicle service system in operative proximity to said vehicle service area, said inspection and/or adjustment generating a first set of vehicle service results;
   identifying, at said local vehicle service system, one or more additional vehicle service procedures for the vehicle requiring communication with one or more vehicle onboard components;
   communicating vehicle identifying information, said first set of vehicle service results, and information associated with said one or more identified vehicle service procedures, from said local vehicle service system to a cloud-based vehicle service system via a communications network;
   responsive to receipt of said communicated vehicle identifying data and said information associated with said one or more identified vehicle service procedures at said cloud-based vehicle service system, relaying said conveyed vehicle identifying data and said information associated with said one or more identified vehicle service procedures to a local interface device via said communications network;
   configuring said local interface device in response to said relayed vehicle identifying data;
   operating said configured local interface device to conduct said one or more selected vehicle service procedures and to generate a second set of vehicle service results;
   communicating said second set of vehicle service results from said local interface device to said cloud-based vehicle service system via said communications network; and
   combining, at said cloud-based vehicle service system, said first and second sets of vehicle service results into a vehicle service record.

2. The method of claim 1 further including conveying operative instructions to an onboard vehicle electronic control unit from said cloud-based vehicle service system via said local interface device during at least a portion of said selected vehicle service procedures.

3. The method of claim 1 further including communicating, from said local interface device to said local vehicle service system through said cloud-based vehicle service system, said second set of vehicle service results, and
   displaying said second set of vehicle service results to a local technician in a graphical user interface of the local vehicle service system.

4. The method of claim 1 wherein said initial inspection and/or adjustment to said vehicle with said local vehicle service system includes a vehicle wheel alignment inspection.

5. The method of claim 1 wherein said local vehicle service system is a vehicle wheel alignment measurement system, and wherein said selected service procedures are associated with a vehicle onboard ADAS sensor.

6. The method of claim 5 wherein said selected service procedures include at least one of a pre-adjustment vehicle ADAS system verification scan, a post-adjustment vehicle ADAS system scan, and a vehicle ADAS system calibration.

7. The method of claim 5 wherein said selected service procedure includes providing a local service technician with instructions for placement of a vehicle onboard ADAS sensor calibration target or fixture in proximity to said vehicle.

\* \* \* \* \*